Sept. 7, 1965　　　W. O. HENSCHKE ETAL　　　3,205,386
ELECTRICAL COIL FOR A MAGNETO OR THE LIKE
Filed Jan. 5, 1961

INVENTORS
WILLIAM O. HENSCHKE
JOHN C. VAN AMSTERDAM
BY *Teller & McCormick*
ATTORNEYS

United States Patent Office 3,205,386
Patented Sept. 7, 1965

3,205,386
ELECTRICAL COIL FOR A MAGNETO OR THE LIKE
William O. Henschke, Longmeadow, and John C. Van Amsterdam, Springfield, Mass., assignors to R. E. Phelon Company, Inc., East Longmeadow, Mass., a corporation of Massachusetts
Filed Jan. 5, 1961, Ser. No. 80,841
3 Claims. (Cl. 310—208)

This invention relates to electrical coils for magnetos, generators and other electric devices, and deals more particularly to an electrical coil having improved means for mounting the same to the iron core or pole structure of the device in which it is used.

An example of a device in which the coil of the present invention may be employed is the magneto mechanism shown and described in the J. F. Martin Patent No. 2,915,574. It is to be understood, however, that the improved mounting means for the coil shown herein is not limited to magneto coils, but may be used as well in conjunction with other types of electrical coils which are mounted on iron poles or cores.

The general object of this invention is to provide an electrical coil having a center opening for receiving a core or pole structure and mounting means in the center opening for fitting the coil without looseness to cores or poles of various thicknesses. The said core or pole to which the coil is fitted is generally of laminated construction and, due to variances in the thickness of the flat stock from which the laminations are cut, normally has a dimensional tolerance in thickness which may be as great as the thickness of one lamination. It has therefore been a customary practice in the past to make the coil center openings of a size at least as large as the thickest pole or core, with the result that most coils fitted loosely on the poles or cores with which they were assembled. In many cases the coils are additionally cemented to the cores or poles, however, in the past the loose fit between the coils and the cores or poles meant that the coil and core or pole assemblies had to be handled with care until the cement hardened, so that further assembly operations often had to be delayed for quite some time.

A further object of this invention is therefore to provide an electrical coil having means adapted to frictionally grip and hold the coil to a laminated core or pole having a thickness anywhere within the normal range of thickness variation for such a core or pole whereby the coil and core or pole assembly may be handled in a normal manner and subjected immediately to further assembly operations without danger of the coil falling from the pole while the cement used to more permanently fix the coil to the core or pole hardens.

A further object of this invention is to provide an electrical coil having mounting means which serve to accurately center the coil on the core or pole to which it is assembled thereby assuring that parts of the coil will not interfere with other parts of the device in which it is used in cases where the space available for the coil is limited.

Other objects and advantages of the invention will be apparent from the following description and from the accompanying drawings.

In the drawing there is shown in detail a preferred embodiment of the invention, but it will be understood that various changes may be made from the construction shown, and that the drawing is not to be construed as defining or limiting the scope of the invention, the claims forming a part of this specification being relied upon for that purpose.

Figure 1:
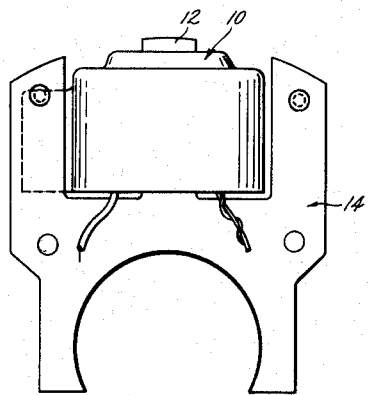
FIG. 1 is a side elevational view of a coil embodying this invention shown mounted on a pole of an associated magneto core structure.

Referring to the drawing, FIG. 1 shows an electrical coil 10 mounted on the center pole 12 of a three-pole magneto core structure 14. The particular coil and core assembly shown is adapted for use in a magneto similar to that shown in the above-mentioned patent, however, within the scope of the present invention the coil and core structures may both vary widely, and the core structure may be that of a generator, transformer, or other electric device having coils to which the novel features of the present invention are applicable. Except as to these hereinafter described features of novelty, the coil and core structures as shown and described are intended to be merely exemplary.

The coil to which the invention more particularly relates comprises at least one electrical winding having a center opening fitted with a tubular liner. The liner has a longitudinal opening for receiving the pole with which the coil is to be assembled and this opening is of a nominal size in transverse cross section at least as large or larger than the size of the pole in transverse cross section. The inner surface of the liner is in turn provided with means for fitting the generally oversize liner opening to any one of a number of slightly different pole sizes so that the coil after assembly with the pole will be securely held in place by friction forces. This latter means comprises one or more ribs or protrusions formed on the inner surface of the liner which ribs or protrusions extend inwardly in a transverse direction so portions thereof will interfere with the pole as the coil is assembled therewith. These ribs or protrusions are in turn made of such a material and are of such a size and shape that those portions which do interfere with the pole may be displaced by the pole, either by a shearing action or a deforming action. The remaining portions of the rib or protrusions thereafter engage the sides of the pole and hold the coil in place thereon.

Figure 3:
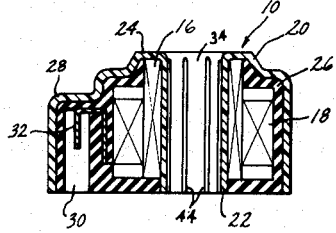
FIG. 3 is a longitudinal sectional view of the coil taken on the line 3—3 of FIG. 2.
Figure 4:
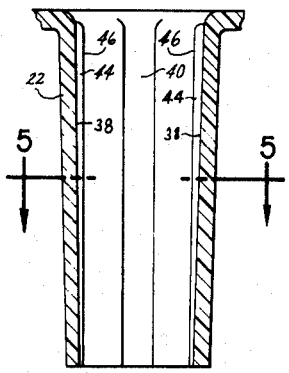
FIG. 4 is an enlarged longitudinal sectional view of the center or chimney portion of the coil taken along the line 4—4 of FIG. 2.

The illustrated coil 10, as best shown in FIG. 3, comprises two separate electrical windings 16 and 18 with the winding 18 being wound around the winding 16. In this case the winding 16 comprises a primary winding having a small number of turns, for example 175, and the winding 18 comprises a secondary winding having a large number of turns, for example 10,000. As pertains to the invention, however, the number of windings is not important and in many instances there may be only one winding.

Included in the coil 10 is a cup-shaped outer shell 20 having a tubular chimney portion 22 which is integrally connected with the base 24 and which extends longitudinally through approximately the center thereof. In FIGS. 1 and 3 the shell is inverted so that the base 24 actually appears at the top of the figures. The two windings 16 and 18 are housed within the shell and surround the chimney portion 22 so that the latter portion extends through the center opening of the coil 16 and of the coil 18. The chimney portion 22 therefore constitutes the coil liner referred to above. The coils 16 and 18 are held within the shell 10 by a suitable impregnating or potting material 26 which fills the otherwise empty spaces between the coils and the shell and which adheres to the shell. At one point along its circumference the shell 10 is provided with a protrusion 28 and the impregnating material within this protrusion is provided with a bore 30 for receiving an insulated conductor such as that associated with the spark plug of an engine. At the upper end of the bore 30, and partly embedded in the potting material 26, is a terminal element 32 for making electrical connection between one end of the secondary winding 18 and the conductor inserted in the bore.

The shell 10, including the chimney portion, is preferably a one-piece molded unit made of a plastic material, such as moldable phenolic resin, however, other suitable materials may also be used. Also the coil liner formed in the illustrated case by the chimney portion 22 need not, as concerns the broader aspects of this invention, be made as a part of the coil shell, but could be a separate unit in a coil having a separate shell or no shell at all.

Figure 2:
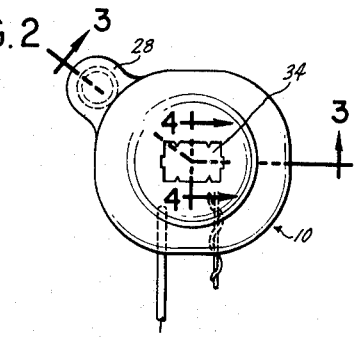
FIG. 2 is a top view of the coil shown in FIG. 1.

Referring to FIGS. 2 and 3, it will be noted that the chimney portion 22 has a longitudinal opening 34 having a generally rectangular shape in transverse cross section. This shape corresponds generally to the shape of the pole 12 on which the coil is to be mounted. For differently shaped poles the opening 34 may accordingly be differently shaped. Due to their laminated construction, however, the poles on which most electrical coils are placed are of a generally rectangular cross section. Also due to the laminated constrution, the poles of two supposedly identical core structures may vary in thickness by a considerable amount. In manufacturing a quantity of similar core structures, different portions or lots of the flat stock from which the laminations are cut, are likely to have slightly different thicknesses. As the laminations are stacked to form a complete core the dimensional errors may be cumulative; the core may be made from all thin or undersize laminations or all thick or oversize laminations. Consequently, the thickness of a pole of any one of a number of similar core structures will generally fall within a tolerance range defined by given values of maximum and minimum thickness.

Figure 5:
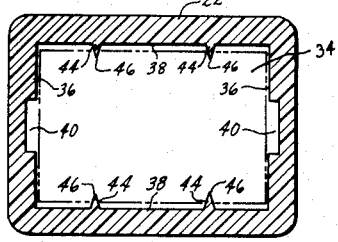
FIG. 5 is an enlarged transverse sectional view of the center or chimney portion of the coil taken along the line 5—5 of FIG. 4.
Figure 6:
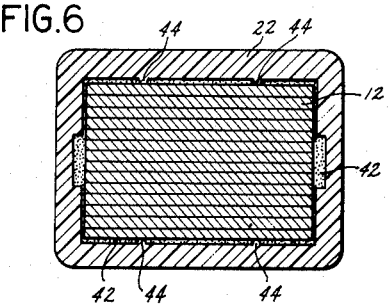
FIG. 6 is a view similar to FIG. 5 but showing the coil assembled with a pole.

To provide for this uncertainty in the thickness of the pole, the opening 34 in the chimney is made to have a nominal size at least as large as the size of a maximum thickness pole. Referring to FIGS. 5 and 6, it will be noted that the opening 34 is defined in general by a first pair of opposed faces 36, 36 and a second pair of opposed faces 38, 38 of the chimney portion. When the coil is assembled with a pole 12, the faces 36, 36 are disposed perpendicular to the planes of the individual laminations and engage or substantially engage the corresponding sides of the pole. The length of the pole as measured between said corresponding sides depends on the accuracy with which the laminations are cut from the flat stock and in general varies only by an insignificant amount from pole to pole. The spacing between the faces 36, 36 may therefore be made such that the faces closely fit with the corresponding sides of the pole and in general need not include much, if any, allowance for differences in the cross-sectional lengths of different poles. The faces 36, 36 are substantially parallel to one another and may be perfectly parallel, but in the present case where the shell 10, including the chimney portion 22, is a molded unit, they are preferably provided with a slight longitudinal draft to aid in the removal of the shell from its mold. Each of the faces 36, 36 includes a shallow longitudinal recess or groove 40 which serves to receive cement 42 for more permanently securing the coil to its pole. Although not shown it is contemplated that the faces 36, 36 could if desired be provided with ribs or protrusions, as described below in connection with the faces 38, 38, for fitting said faces more accurately to the cross-sectional length of the associated pole as measured between the corresponding sides thereof.

The opposed faces 38, 38 are spaced apart by a distance at least as large as the thickness of the maximum size pole. Few poles in a given quantity of similar core structures will have such maximum size and therefore for the remainder of the poles the opening will be oversize and the faces 38, 38 spaced apart too far to make simultaneous contact with the corresponding sides of the pole. In accordance with this invention, this difference in size is made up by at least one rib or protrusion formed on at least one of the faces 38, 38. Preferably there are a plurality of such ribs or protrusions on each face, and in the present case each face is provided with two ribs indicated at 44, 44. Preferably the ribs 44, 44 extend longitudinally for substantially the full length of the chimney, although this is not necessary and in place of the ribs there might be provided a number of relatively short protrusions located at different positions along the length of the faces 38, 38. The ribs 44, 44 extend inwardly in a transverse direction into the space occupied by a pole after the coil is assembled therewith. That is, when there are ribs on each of the faces 38, 38 the inner edges 46, 46 of the ribs on one face are spaced from the inner edges of the ribs on the other face by a distance less than the thickness of a minimum size pole. Thus, during assembly of the coil with a pole the inner end portions of the ribs will interfere with the pole on which it is placed. This is shown in FIG. 5 where the broken line indicates the position of a pole after assembly.

The ribs 44, 44 are in turn made of such a material and are so shaped that those portions thereof which do interfere with the pole are relatively easily displaced by the pole as the coil is manually or otherwise pressed onto the pole. Depending on the rib material the interfering portions may be either sheared from the remaining rib portions or may be deformed by bending or plastic flow to make way for the pole. In either event the ribs will be reduced to such a size as to exactly fit the chimney to the pole and will frictionally engage the corresponding sides of the pole as shown in FIG. 6. In the illustrated case the ribs are integral with the chimney portion 22 and are formed of the same plastic material. In transverse cross section they are of a relatively thin shape so that the interfering portions thereof are readily displaced, and they are thinner at the edges 46, 46 than at their bases, each becoming progressively thicker in going from its edge 46 to its base.

The opposed faces 38, 38 are substantially parallel to one another and may be perfectly parallel, but similarly to the faces 36, 36 are preferably provided with a slight longitudinal draft to aid in removing the shell from its mold. The ribs 44, 44 however are preferably formed so that their inner edges are exactly parallel with the result that after assembly of the coil with a pole the ribs will engage the pole along their full length despite the draft of the opposed faces 38, 38. Due to the fact that the ribs are relatively small in size the fact that they include no longitudinal draft does not seriously impair the ease with which the shell is removed from its mold.

It should be noted that in addition to holding the coil to the pole, the ribs also serve to prevent a possible cocking of the coil on the pole, which might occur in the case of a chimney portion or liner with draft on its inner faces and without ribs. It should also be noted that the pole will tend to shear or deform equal amounts of material from each rib and that therefore the ribs will tend to center the coil on the pole so as to accurately locate it in relation to the pole and other structure of the electric device in which it is used. Before the coil is assembled with a pole cement 42 may be applied to either the outer surfaces of the pole or to the inner surfaces of the coil chimney. After assembly, the cement will fill the spaces between the coil and the pole, as shown in FIG. 6, and after hardening will securely fix the coil to the pole. While the cement hardens, however, the ribs 44, 44 provide sufficient gripping action to hold the coil to the pole so that the assembly may be handled in an ordinary manner and without excessive care.

The invention claimed is:

1. An electrical coil adapted for mounting on a pole of a magneto or the like, which pole is generally rectangular in shape and has an actual thickness falling within a tolerance range defined by given values of maximum and minimum possible thickness, said coil comprising at least one electrical winding having a center opening, a tubular liner located in said center opening and fixed relative to said winding, said liner having a generally rectangular opening for receiving said pole which opening is defined in part by two generally parallel opposed faces which faces are spaced apart at their narrowest point by a distance no less than said maximum possible thickness of said pole, and a plurality of longitudinally extending ribs on each of said opposed liner faces with the inner edges of the ribs on one of said faces being spaced from the inner edges of the ribs on the other of said faces by a distance less than said minimum possible thickness of said pole so that portions of said ribs will interfere with said pole as said coil is assembled therewith, said ribs being relatively thin in transverse cross section so that the portions thereof which interfere with said pole may be displaced by said pole as said coil is placed thereon to fit said liner to the actual thickness of said pole.

2. An electrical coil adapted for mounting on a generally rectangularly shaped pole of a magneto or the like, said coil comprising a generally cup-shaped outer shell having a tubular chimney portion connected with the base thereof and extending longitudinally from said base through approximately the center of said shell, at least one electrical winding disposed in said cup and surrounding said chimney portion, said chimney portion having a generally rectangularly shaped longitudinal opening for receiving said pole which opening is defined in part by two generally parallel opposed faces of said chimney portion which faces are spaced apart at their narrowest point by a distance no less than the thickness of said pole, and a plurality of longitudinally extending ribs on each of said opposed faces with the inner edges of the ribs on one of said faces being spaced from the inner edges of the ribs on the other of said faces by a distance less than the thickness of said pole so that portions of said ribs will interfere with said pole as said coil is assembled therewith, said ribs being relatively thin in transverse cross section so that the portions thereof which interfere with said pole may be displaced by said pole as said coil is placed thereon to fit said chimney portion to said pole.

3. The combination as defined in claim 2 further characterized by said cup-shaped outer shell being of molded plastic construction, said opposed faces of said chimney portion having a slight draft to aid in the removal of said shell from its mold, and said inner edges of said ribs being parallel to one another so as to have no draft with the result that after the assembly of said coil with said pole said ribs will engage said pole along their full lengths despite the draft of said opposed faces.

References Cited by the Examiner

UNITED STATES PATENTS

| 1,506,746 | 9/24 | Griffith | 310—215 X |
| 2,269,651 | 1/42 | Crocker | 310—216 |
| 2,322,932 | 6/43 | Hahn | 310—194 X |
| 2,744,204 | 5/56 | McGuiness | 310—218 |

FOREIGN PATENTS

| 626,823 | 7/49 | Great Britain. |

MILTON O. HIRSHFIELD, *Primary Examiner.*